(12) United States Patent
Praca

(10) Patent No.: US 7,289,959 B2
(45) Date of Patent: Oct. 30, 2007

(54) BIOMETRIC IDENTIFICATION METHOD, PORTABLE ELECTRONIC DEVICE AND ELECTRONIC DEVICE ACQUIRING BIOMETRIC DATA THEREFOR

(75) Inventor: Denis Praca, Luynes (FR)

(73) Assignee: Gemplus, Gemenos (FR)

( * ) Notice: Subject to any disclaimer, the term of this patent is extended or adjusted under 35 U.S.C. 154(b) by 796 days.

(21) Appl. No.: 10/221,034

(22) PCT Filed: Mar. 6, 2001

(86) PCT No.: PCT/FR01/00671

§ 371 (c)(1),
(2), (4) Date: Sep. 9, 2002

(87) PCT Pub. No.: WO01/67399

PCT Pub. Date: Sep. 13, 2001

(65) Prior Publication Data

US 2003/0040913 A1    Feb. 27, 2003

(30) Foreign Application Priority Data

Mar. 10, 2000    (FR) .................................. 00 03282

(51) Int. Cl.
G10L 11/00 (2006.01)
G10L 17/00 (2006.01)
H04L 9/00 (2006.01)
G06K 9/00 (2006.01)

(52) U.S. Cl. .................. 704/270.1; 704/246; 704/270; 713/186; 382/115

(58) Field of Classification Search ..................... None
See application file for complete search history.

(56) References Cited

U.S. PATENT DOCUMENTS 4,582,985 A * 4/1986 Lofberg ....................... 235/380
4,993,068 A * 2/1991 Piosenka et al. ............. 713/186
5,623,552 A * 4/1997 Lane ............................. 382/124

(Continued)

FOREIGN PATENT DOCUMENTS

WO    WO98/01820    1/1998

(Continued)

OTHER PUBLICATIONS

Moon et al., "A Secure Card System with Biometrics Capability", 1999 IEEE Canadian Conference on Electrical and Computer Engineering, May 9-12, 1999, vol. 1, pp. 261-266.*

(Continued)

Primary Examiner—David Hudspeth
Assistant Examiner—Brian L. Albertalli
(74) Attorney, Agent, or Firm—Buchanan Ingersoll & Rooney PC

(57) ABSTRACT

A biometric identification method includes the steps of acquiring biometric data, analysing the data to produce a current signature, and comparing the current signature with a reference signature. To this process is added the further step of verifying the origin of the current signature, by determining whether the signature is actually the result of the analysis of the biometric data obtained during the acquisition phase. The verification and comparison steps are preformed in a portable electronic device, such as a smart card.

10 Claims, 3 Drawing Sheets

U.S. PATENT DOCUMENTS

| | | | | |
|---|---|---|---|---|
| 5,677,989 A * | 10/1997 | Rabin et al. | | 704/246 |
| 5,956,415 A * | 9/1999 | McCalley et al. | | 382/124 |
| 6,006,328 A * | 12/1999 | Drake | | 726/23 |
| 6,024,287 A * | 2/2000 | Takai et al. | | 235/493 |
| 6,119,084 A * | 9/2000 | Roberts et al. | | 704/246 |
| 6,119,804 A * | 9/2000 | Owen | | 181/113 |
| 6,208,746 B1 * | 3/2001 | Musgrave | | 382/100 |
| 6,332,193 B1 * | 12/2001 | Glass et al. | | 713/170 |
| 6,480,825 B1 * | 11/2002 | Sharma et al. | | 704/270 |
| 6,719,200 B1 * | 4/2004 | Wiebe | | 235/382 |
| 6,751,733 B1 * | 6/2004 | Nakamura et al. | | 713/182 |
| 6,910,131 B1 * | 6/2005 | Yamada et al. | | 713/186 |
| 6,957,339 B2 * | 10/2005 | Shinzaki | | 713/186 |
| 6,970,573 B2 * | 11/2005 | Carr et al. | | 382/100 |
| 2002/0095587 A1 * | 7/2002 | Doyle et al. | | 713/186 |

FOREIGN PATENT DOCUMENTS

| | | |
|---|---|---|
| WO | WO99/13434 | 3/1999 |
| WO | WO 00/10134 | 2/2000 |
| WO | WO 00/42577 | 7/2000 |

OTHER PUBLICATIONS

Moon et al., "Collaborative fingerprint authentication by smart card and a trusted host", 2000 Canadian Conference on Electrical and Computer Engineering, Mar. 7-10, 2000, vol. 1, pp. 108-112.*

* cited by examiner

BIOMETRIC IDENTIFICATION METHOD, PORTABLE ELECTRONIC DEVICE AND ELECTRONIC DEVICE ACQUIRING BIOMETRIC DATA THEREFOR

This disclosure is based upon French Application No. 00/03282, filed on Mar. 10, 2000 and International Application No. PCT/FR01/00671, filed Mar. 6, 2001, the contents of which are incorporated herein by reference.

BACKGROUND OF THE INVENTION

Biometric identification method, portable electronic device and electronic device for acquiring biometric data for its implementation The invention relates to the field of biometry.

In this technical field, which consists of acquiring, measuring and recognising physical characteristics of a user, many recognition methods are already known, concerning voice characteristics, characteristics specific to the shape of the face or the iris of the eye or, in the most frequent case, fingerprint characteristics.

Most research work aims to improve the quality of the recognition, that is to say reduce as much as possible the number of erroneous recognitions or rejections. Other work aims to optimise the algorithms, reducing the calculating power necessary for their implementation.

Furthermore, a method commonly used for identifying a user consists of presenting a secret identification code, also called a PIN (Personal Identification Number). Since the increase in the number of these codes makes their storage difficult, biometry would be a possible alternative, provided that it provides an equivalent level of security.

One of the preferred fields of use of secret codes relates to portable electronic objects, in particular smart cards (memory or microprocessor cards). Such objects are in general used in applications requiring a very high degree of security such as bank debit/credit applications or access control applications. This is because, owing to the structure of these objects, no secret data is accessible from the outside, which makes it possible to obtain very high protection.

It is logical to combine the simplicity of use afforded by biometry techniques with the security imparted by smart card type portable electronic objects.

Many proposals have therefore been made along these lines. For example the French patent FR-B-2 674 051 can be cited.

All the existing biometric systems and methods break down into three phases which are depicted in FIG. 1. The first phase (10) is a phase of acquiring biometric data (15) during which a characteristic of the user will be measured. The biometric data (15) obtained during this phase are most often images for fingerprint, iris or face shape recognition, but they can also be sound sequences in the voice recognition case.

The second phase (20) is an analysis phase making it possible to extract a current signature (25), that is to say a set of representative data, from the biometric data (15), image or sound, obtained during the acquisition phase (10). This second phase (20) is extremely complex and requires a great deal of calculating power. The rate of erroneous recognitions or rejections, which is an indication of the quality and reliability of the method or the system, depends directly on the algorithms which will be implemented. Since the invention applies to any algorithm type, it therefore does not concern the improvement of these algorithms which furthermore forms the object of much research.

Similarly, the optimisation of these algorithms, so as to reduce the calculating power for implementing them and their execution time, is not the object of the invention either, although it is also the object of much research work.

The third phase (30) consists of comparing the current signature (25), obtained during the second phase (20), with a reference signature (35) defined previously during registration of the user.

Although much more complex than the second phase (20), in particular as regards the calculating power necessary, this third phase (30) is also a separate study field.

Smart card type portable electronic objects are provided with microprocessors, the calculating power of which still remains limited: as depicted by FIG. 2, it is possible to provide the portable object with a sensor and a memory so that the acquisition phase (10) and the comparison phase (30) are implemented by said object; on the other hand, the processor of the portable object is still incapable of implementing the phase of analysing (20) the biometric data (15) and extracting the current signature (25).

In order to implement said phase (20), it is necessary to have recourse to the processor of a computer. The security problems appear during the exchanges of information (15, 25) between the portable object and said computer. This is because the computer is not a secure system, and it is easy for hackers to intercept the data which are circulating, for example by means of a "Trojan Horse" type program. Thus hackers could intercept the biometric data (15) during the first exchange, or perhaps even the current signature (25) originating from the extraction phase (20), in order to use them fraudulently later by passing themselves off as the user.

Current systems using biometric identification therefore have a significant security problem.

BRIEF DESCRIPTION OF THE DRAWINGS

This is the problem the invention proposes to solve, said invention being better understood from a reading of the following description and drawings, given on a non-limitative basis. In the drawings.

DETAILED DESCRIPTION

Figure 1:
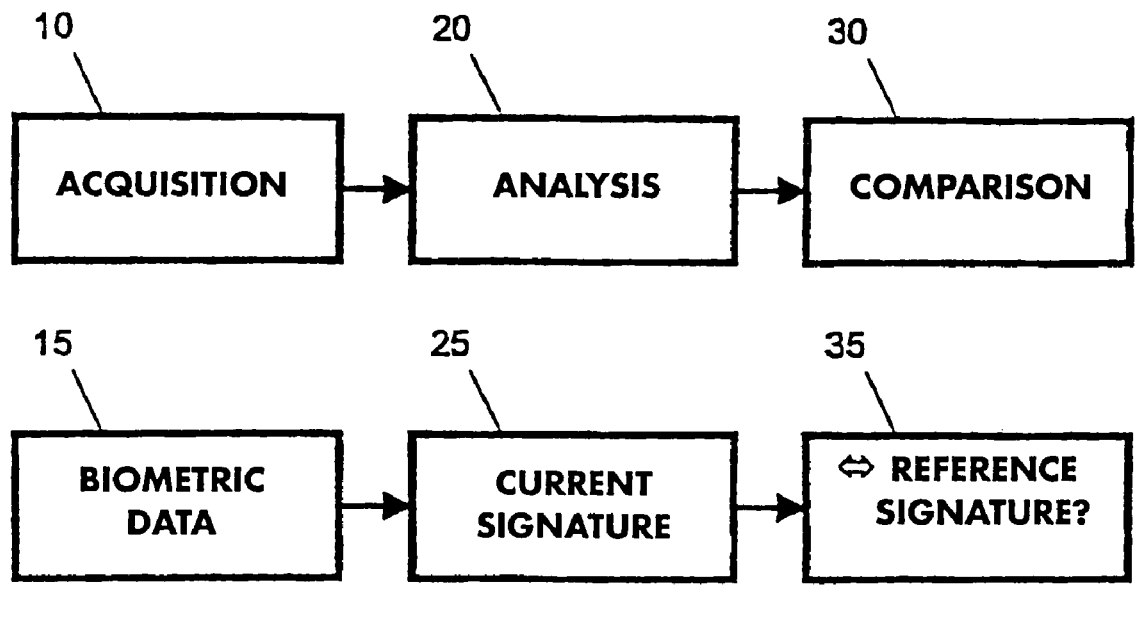
FIG. 1 depicts the three phases of a biometric identification method according to the prior art.
Figure 1:
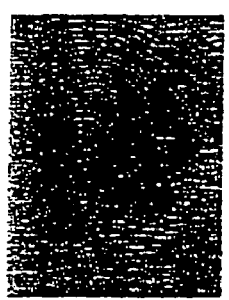
Figure 1:
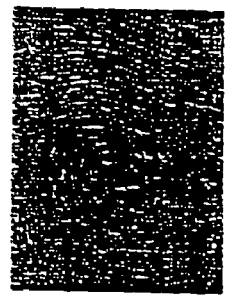
Figure 1:
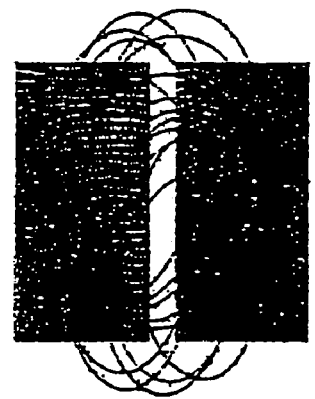
Figure 2:
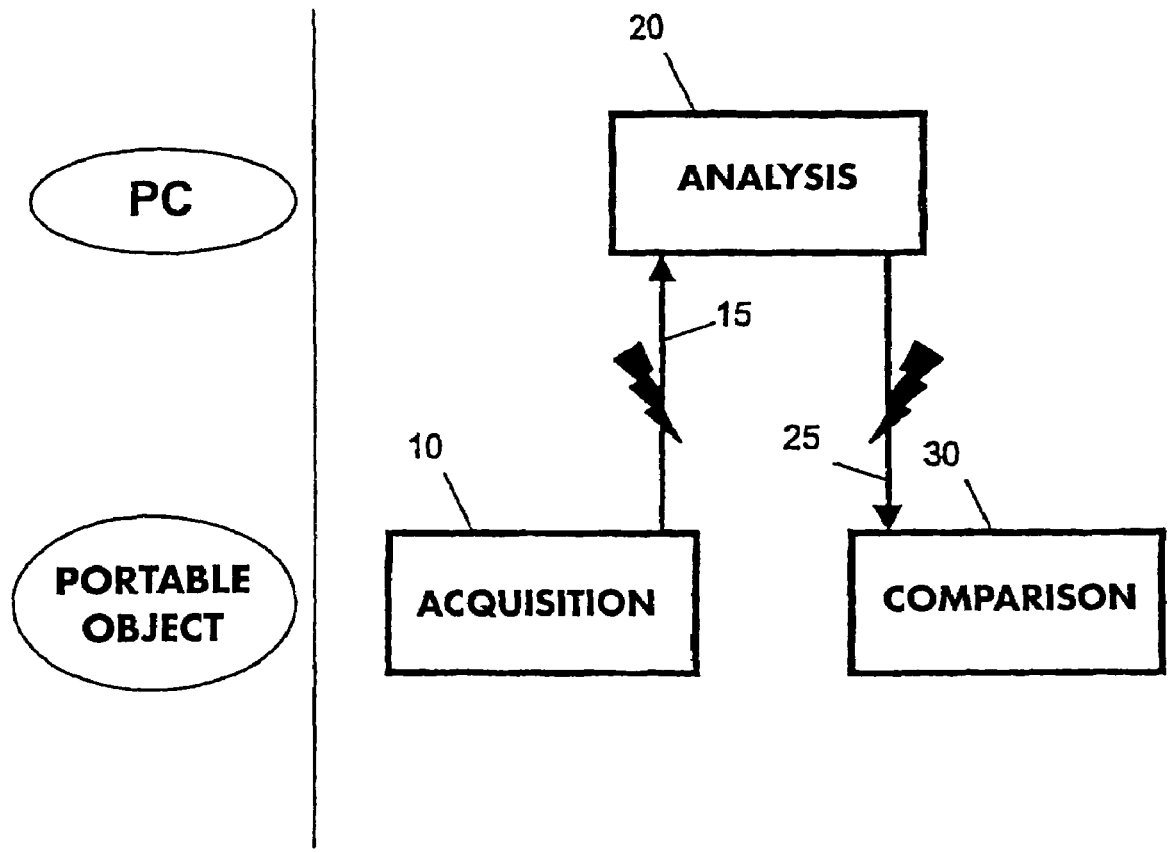
FIG. 2 depicts the distribution of tasks between a portable electronic object and a computer.
Figure 3:
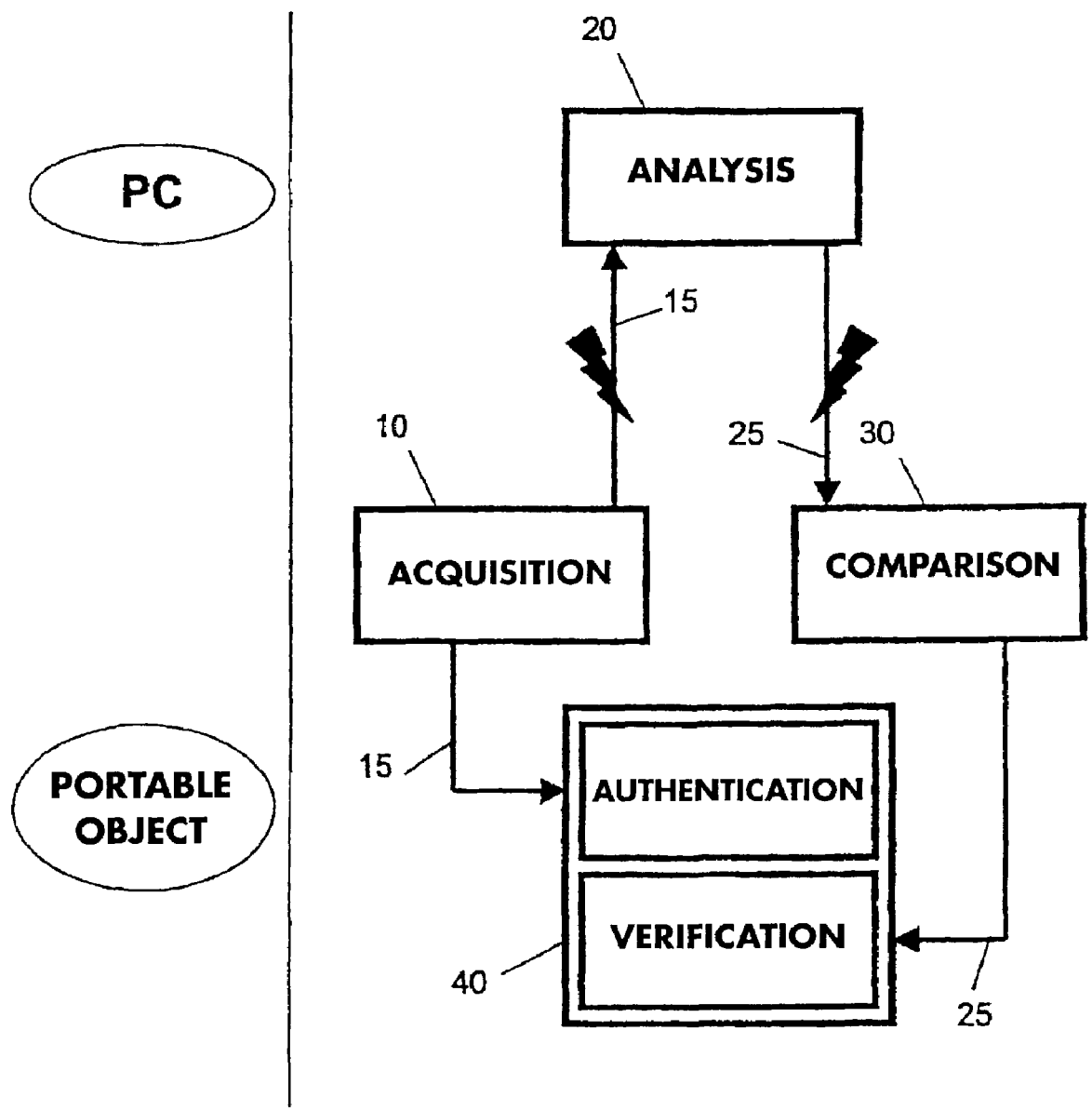
FIG. 3 depicts a biometric identification method according to the invention.

A method according to the invention makes it possible to solve the security problems described previously by adding, to the acquisition phase (10), the analysis phase (20) and the comparison phase (30), a phase of verifying (40) the origin of the current signature making sure that the current signature is actually the result of the analysis of the biometric data obtained during the acquisition phase. This verification phase can be broken down into two steps:

an authentication step which makes sure that the biometric data, image or sound, used during the phase of extracting (20) the current signature (25), are actually the biometric data (15) produced by the sensor during the acquisition phase (10), and not false data supplied by a hacker in order to deceive the system.

then it is necessary to verify that the current signature (25) does actually originate from the analysis of the biometric data (15), and is not a false current signature supplied by a hacker in order to deceive the system.

Advantageously, the comparison step (30) of a method according to the invention is performed within a portable electronic device in which a reference signature (35) is stored. The verification phase (40) can also be performed within said portable electronic device.

A smart card type portable electronic device according to the invention comprises biometric data acquisition means. In a first embodiment of the invention, these acquisition means comprise a sensor, so that the portable device is certain of the source of the biometric data (15) generated by the sensor in order to carry out an identification since these data do not come from the outside, but on the contrary are directly generated within the portable electronic device. Furthermore, the portable device also comprises storage means storing at least one reference signature (35), and comparison means capable of comparing a current signature (25) with the reference signature or signatures (35) kept in the storage means. Thus, the step of comparison (30) between the reference signature (35) and a current signature (25) is performed within this portable device.

The electronic device also has verification means which are capable of verifying that the current signature (25) comes from the analysis of the biometric data acquired (15) by the acquisition means. According to the invention, the device must make sure that the current signature (25) actually comes from the analysis of the biometric data (15) generated by the sensor. To that end, the biometric data (15) are kept in a memory of the portable object. The biometric data (15) are also transferred to a more powerful external device, such as a computer, in order to carry out the analysis phase (20) allowing extraction of the current signature (25). The current signature (25) is next sent back to the portable object. But said portable object does not just compare the current signature (25) with the reference signature (35) of the user, which was pre-recorded: it also performs a verification step in order to ascertain whether the current signature (25) it has received actually corresponds to the biometric data (15) kept in memory after the acquisition phase (10).

Such a verification phase (40) requires a limited calculating power and can certainly be implemented by the processor of a smart card type electronic object. A method or a system according to the invention therefore allows the identification of the user to be made totally secure.

This is because the identification process necessarily starts with the acquisition of biometric data (10), image or sound, and their saving in an inaccessible memory. This step of acquiring (10) and keeping an image or a sound is totally secure owing to the techniques commonly used in smart card type portable electronic objects. During exchanges between the portable object and the analysis device, hackers can still intercept the biometric data (15) and/or the current signature (25) associated with these data. On the other hand, they cannot subsequently load into the memory of the portable electronic object the biometric data (15) they have pirated. Consequently, hackers cannot use a current signature (25) they have pirated either, since it does not correspond to the biometric data stored (15) in the portable electronic object at the beginning of the identification process.

In a variant embodiment of the invention, the sensor does not form part of the portable electronic device. The sensor being non-integral with the portable electronic device, the acquired biometric data (15) must be transmitted to said portable electronic device for it to store them, so as to be able to verify that the current signature (25) is actually the result of the analysis of said data (15).

To that end, the acquisition means of the portable electronic device comprise communication means capable of receiving biometric data (15) originating from the sensor non-integral with the portable electronic device.

The origin of the data received by the communication means must be guaranteed in order to avoid any fraud. In the case of a fixed sensor, forming for example part of a cash dispenser or a security lock, a physical security mechanism may be sufficient to ensure that the data received by the portable electronic device are actually those which have just been acquired by the sensor. In the other cases, for example in the case of a movable sensor, or if the exchanges take place via a PC, the acquisition means of the portable electronic object comprise verification means. These verification means make it possible to guarantee the source of the data received by the portable device by implementing conventional techniques, for example a secure exchange protocol using certificates or cryptographic techniques common in the field of smart card type portable electronic objects.

In another variant embodiment of the invention, whether or not the sensor is integral with the portable electronic object, the biometric data (15) originating from the acquisition phase (10) are not stored in a memory in order to perform the verification of the origin of the current signature obtained during the analysis phase (20). In order to provide the two functions making it possible to solve the security problems raised (verification that the biometric data received were actually produced by the sensor during the acquisition phase (10), and verification that the current signature (25) does actually originate from the analysis (20) of these biometric data, a watermarking or "tag" technique is used.

This technique, which is frequently used to protect copyrights, makes it possible to insert identification information within data it is wished to be able to identify. Preferably, the data are inserted so as to be undetectable. In the present case, the identification data must be inserted so that they do not disappear during the analysis phase (20). The insertion method will therefore depend on the type of data to be analysed (audio or video), and on the processing these data will undergo during their analysis.

This adaptation of the insertion method to the analysis method does not pose any particular problem when the sensor and the analysis device are matched, that is to say specifically designed to operate together. This will be the case in particular when the sensor and the analysis device both form part of a fixed station, such as an automatic cash dispenser or an access control station. The generation of the watermark will use conventional techniques making it possible to generate a different watermark for each use. Thus, upon two successive uses of one and the same system with the same portable object, two different watermarks will be superimposed on one and the same set of biometric data (15), image or sound, supplied by the sensor. In this way, if a hacker succeeds in intercepting the data with their watermark during their transmission by the sensor to the portable object, these data cannot be reused fraudulently since the watermark associated with them will no longer be valid.

The portable electronic object must naturally be in a position to detect the watermark and to verify the validity thereof.

If the biometric data (15) which are used represent a fingerprint, the analysis of which comprises contour extraction and the detection of singularities such as intersection points or end points, the image can be marked by inserting artificial singularities at locations which will change at each identification attempt.

The methods described in the different embodiments of the invention described previously can be combined. Thus, a watermarking technique can be used to protect the transfer of biometric data (15) between the sensor and a portable electronic object, said electronic object then storing said data in a memory in order to be able to verify that it corresponds to the current signature (25) obtained after the analysis phase (20). In this case, the analysis can destroy the watermark without reducing the security, and the watermarking technique can even be replaced by a cryptographic certification technique. In general terms, any protection can be used, whether this is physical or logical: it suffices that it provides the verification function proving that the image received by the portable electronic object is actually the image which was generated by the sensor.

Thus, where the sensor is not integral with the portable electronic object, use will be made of an electronic device for acquiring biometric data (15) comprising a sensor also comprising communication means for exchanging data with a smart card type portable electronic device, and comprising authentication means capable of authenticating the transmitted data.

As described previously, the authentication means can be capable of inserting watermark type identification data into the transmitted data or else they can comprise means of certification and/or encryption and decryption of the transmitted data.

The invention claimed is:

1. A biometric identification method that is performed with a portable electronic object, comprising the following steps:
   acquiring biometric data;
   generating identification information within said portable electronic object and adding said identification information to said biometric data in said portable electronic object;
   storing said identification information in the portable electronic object;
   providing said biometric data with the added identification information to a device other than said portable electronic object to generate a signature from said biometric data;
   receiving said signature in the portable electronic object;
   verifying within said portable electronic object that the received signature corresponds to the acquired biometric data by determining whether said identification information accompanies the received signature; and
   comparing the received signature to a reference signature stored in the portable electronic object to authenticate an identification, if said received signature is verified to correspond to the acquired biometric data.

2. The method of claim 1, wherein said identification information comprises a watermark that is inserted into the biometric data.

3. The method of claim 1, wherein said identification information comprises a certificate.

4. The method of claim 1, wherein said identification information comprises encryption of the biometric data.

5. The method of claim 1, wherein said portable electronic object comprises a smart card.

6. A portable electronic object comprising:
   a memory having a reference signature stored therein; and
   a processor which functions to generate and add identification information to biometric data acquired by said object, transmit the biometric data with the added identification information to another device to generate a signature from said data; verify whether said identification information accompanies a signature received from said other device, and compare the received signature with the reference signature stored in said memory to authenticate the identification of a user.

7. The portable electronic object of claim 6, wherein said identification information comprises a watermark that is inserted into the biometric data.

8. The portable electronic object of claim 6, wherein said identification information comprises a certificate.

9. The portable electronic object of claim 6, wherein said identification information comprises encryption of the biometric data.

10. The portable electronic object of claim 6, wherein said portable electronic object comprises a smart card.

* * * * *